Patented June 12, 1951

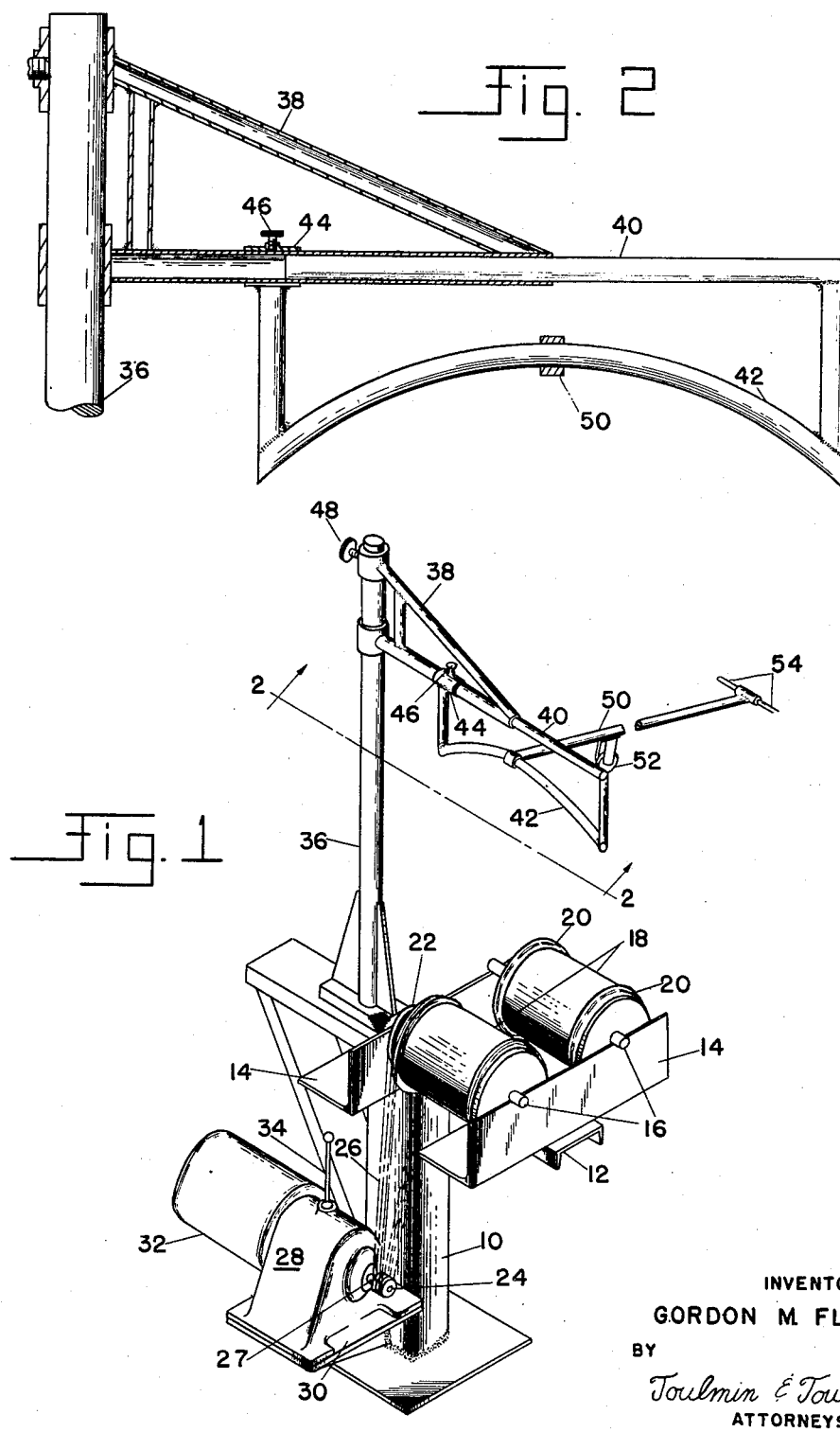

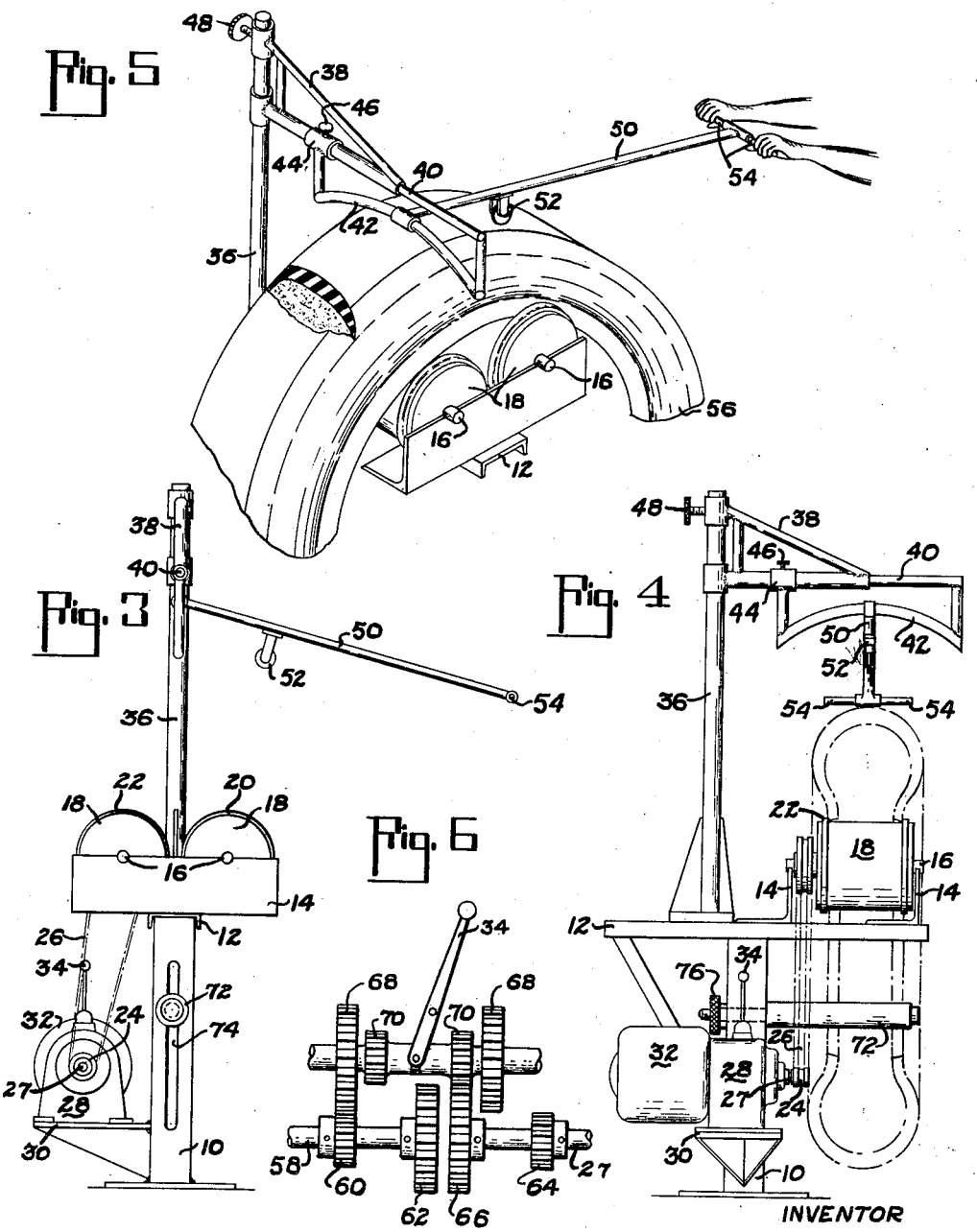

2,556,264

UNITED STATES PATENT OFFICE 2,556,264

TIRE BUILDING MACHINE

Gordon M. Flynn, Clarksburg, W. Va.

Application February 6, 1948, Serial No. 6,609

8 Claims. (Cl. 154—9)

This invention relates to tire building apparatus, and particularly to apparatus for applying or stitching on retreads to tire casings.

The particular object of this invention is to provide an apparatus for retreading tire casings which results in better adhesion between the retread material and the casing to which it is applied.

Another object of this invention is the provision of a method and apparatus for applying retread material to casings in which the time for this operation is substantially reduced.

A still further object is the provision of a machine for retreading tire casings which is adjustable to accommodate several different sizes of casings.

These and other objects and advantages will become more apparent upon reference to the following description taken in connection with the accompanying drawings in which:

Figure 1 is a perspective view showing a machine constructed according to this invention;

Figure 2 is a vertical section through the upper part of the machine and is indicated by the line 2—2 on Figure 1;

Figure 3 is a front elevation of the machine;

Figure 4 is a side elevation of the machine;

Figure 5 is a perspective view showing the machine in operation and a strip of retread material being applied to a tire casing; and Figure 6 is a fragmentary view showing the construction of the gear box interconnecting the drive motor with the casing supporting rolls.

In the art of retreading tire casings, the tread portion of the old casing is first ground, buffed, rasped, or otherwise treated in a manner to roughen up the surface thereof to prepare it for receiving the strip of retreading material. Thereafter a layer of rubber cement of any suitable type is applied to the rasped or roughened surface. This rubber cement is allowed to dry before the new tread material is applied to the casing and according to prior art this drying process occupies a period of about two hours. After the cement is dried a strip of retread material, known in the art as camel-back, is applied around the casing and the ends of the camel-back or retread strip are generally feathered in order to provide a joint therebetween.

The final step in connection with the application of the material to the casing is the stitching process and this is usually carried out by hand-rolling the applied material so that it is pressed against the tire casing and thus sticks thereto because of the rubber cement. This is a long and tedious operation and in the case of very large tires it is almost impossible to effect a good stitching operation by hand.

After the strip of camel-back is adequately stitched to the casing as explained above, the tire is then placed in a mold and the applied material cured. Inasmuch as the adherence of the applied strip of material to the casing is highly critical, it is necessary that the stitching operation be adequately carried out. Otherwise, the new tread will loosen from the casing and either fly off while the tire is rotating after it has been placed on a car, or will admit moisture and dirt particles which will form blisters around the tire and eventually cause the tread to strip completely therefrom.

According to this invention an improved method and apparatus for retreading tire casings is provided by improving on certain of the steps listed above as far as their effectiveness is concerned and in substantially reducing the time required for others thereof.

The process of retreading tire casings according to this invention comprises the following steps:

1. Roughening the tread surface of the tire;

2. Brushing on an ample coat of rubber cement over the roughened surface;

3. Drying the rubber cement by revolving the cemented tire at high speed.

By so revolving the tire the drying of the cement is carried out in about 15 minutes whereas in the usual process the drying time is about two hours.

Due to the fact that the cement is dried in 15 minutes there is much less possibility that it will collect dirt and dust, or that it will be scraped from the casing, or that the cement layer will in any other way have its efficiency impaired.

Accordingly, the high speed drying of the cement is an important step in my process.

4. Over the dried cement the strip of uncured rubber is applied in the usual manner. During this time the tire casing is supported on rolls so that it is free to turn as the workman applies the rubber strip;

5. After the rubber strip is applied to the casing it is stitched down by driving the supporting rollers for the tire and by pressing down on the applied strip by means of a roller mounted on a lever.

The lever mounted roller is free to move laterally back and forth across the strip and thus accomplishes a very good stitching action. Due to the fact that it is lever mounted as much pressure as necessary can be brought to bear on the stitching wheel and thus very large tires can be adequately stitched by practicing the method of this invention.

6. After the retread material is stitched to the casing the tire is placed in a mold and cured.

Due to the saving of time effected by the forced drying of the cement and by the more rapid and effective stitching process, I find that the time and labor accompanying retreading of tire casings is substantially reduced.

Referring to Figure 1 of the drawing, of the apparatus used for carrying out the method described above, it will be seen that the device comprises a pedestal or vertical framework 10 having a lateral extending arm 12 that mounts a pair of spaced angle brackets 14. Extending between the angle brackets 14 are a pair of shafts 16 and on these shafts are the tire supporting rollers 18. The rollers may be beaded or flanged at the edges as at 20 to prevent the casing thereon from slipping endwise of the rollers if so desired.

One of the shafts 16 has mounted thereon a pulley 22 and extending between the pulley 22 and another pulley 24 are a pair of V-belts 26 which transmit power between the said pulleys. The pulley 24 is mounted on the output shaft 27 of a variable speed transmission 28 which is mounted on a platform 30 carried by the pedestal 10 and which also carries a drive motor 32. A shift lever 34 provides for high and low speeds of the pulley 24 and also has a neutral position wherein the said pulley is not driven.

Extending vertically upwardly from the upper end of the pedestal 10 is a column 36 and vertically adjustable on said column is a framework 38 which extends laterally outwardly over the rollers 18. The framework 38 as best seen in Figure 2 is formed of tubing and telescoping one of the tubular parts thereof is a bar or rod 40. The rod 40 supports one end of an arcuate member 42, the other end of which is supported on a horizontal part of the framework 38 by means of the collar 44. It will be apparent that the arcuate member 42 can be adjusted radially toward and away from the column 36 and thus position the said arcuate portion directly over the center of the tire supported on the rollers 18.

A clamping screw 46 is provided for locking the collar 44 and thus the arcuate portion 42 in position. Vertical adjustment of the entire framework 38 is accomplished by sliding it on the column 36 and in turn the framework can be locked in any predetermined vertical position by means of the clamping screw 48.

The arcuate portion 42 slidably receives the end of a lever arm 50 which carries a relatively narrow roller 52 intermediate its ends which is for the purpose of bearing against the surface of a tire being retreaded. The free end of the lever arm 50 has a handle means as at 54 by means of which the roller 52 can be pressed down against the tire.

The appearance of the mechanism from the front and side are shown in Figures 3 and 4, respectively, while in Figure 5 the device is shown with a tire casing 56 mounted on the rollers 18 and with the lever arm 50 being urged by the handle means 54 into position to cause the roller 52 to bear against the periphery of the casing.

As the rollers rotate the lever arm 50 is shifted to and fro on the arcuate member 42 so that the roller 52 can be brought to bear across the entire surface of the tread part of the casing.

Due to the fact that the lever arm 50 is relatively long and can be grasped by both hands, a high pressure can be developed on the surface of the casing and thus bring about the adequate stitching of the retread material thereto.

As mentioned before the tire is rotated at high speed in order to dry the cement applied to the casing before the retread material is placed thereon. This is accomplished by shifting the lever 34 to change the speed of the pulley 24. One gearing arrangement is illustrated in Figure 6 for accomplishing this result.

In Figure 6 the drive motor output shaft is indicated at 58 and mounted thereon is a small gear 60 and a larger gear 62. The output shaft 27 of the transmission similarly has a small gear 64 and a larger gear 66 thereon. Mounted adjacent the shafts 58 and 27 is a sliding gear arrangement including the two larger gears 68 and the two smaller gears 70. The entire sliding gear arrangement is movable by the handle 34 from the position shown in the drawings wherein the rotational speed of the shaft 58 is substantially reduced by driving through the gear 60 and thence through the left hand gear 68 and the right hand gear 70 to the gear 66, to a neutral position wherein the shafts 58 and 27 are disconnected or, into another position wherein the shaft 58 drives through the gear 62 and thence through the left hand gear 70 and the right hand gear 68 to the pinion 64. This gives a greatly increased speed for the shaft 27 and thus drives the pulley 24 and the rollers 18 at high speed.

Should it be found necessary to positively retain the tire casing in engagement with the rollers 18 an auxiliary roller as at 72 may be provided which is vertically adjustable on the pedestal 10 by means of the slot 74 and the knurled hand wheel 76. Normally, the roller 72 will not be necessary, but in event that the inner periphery of the tire is irregular it may be necessary to retain it against the roll 18 during the period that it is driven at high speed for the forced drying of the cement.

Ordinarily, the roller 72 will not be needed during the time the retread material is being applied to the casing or during the time that the tire casing is being driven at low speed to permit operation of the stitching roll 52.

It will be understood that this invention is susceptible to modification in order to adapt it to different usages and conditions and, accordingly, it is desired to comprehend such modifications within this invention as may fall within the scope of the appended claims.

I claim:

1. In a machine for retreading tire casings, a pedestal, support means mounted on said pedestal, roller means journaled on said support means and adapted to support a tire casing having a tread width, driving means for said roller means and drivingly connected therewith, guiding means extending from said pedestal above and in spaced relation with said support means and said roller means, arm means on the said guiding means and movable thereon, and a pressure roller of relatively narrow width compared to the tire casing which pressure roller is supported by said arm means and movable therewith laterally across the tread of the casing to apply pressure to the said tread.

2. In a machine for retreading tire casings, a pedestal, a support means mounted on said pedestal, supporting means mounted on said first support means for supporting a tire casing having a tread width, drive means connected with said second supporting means for rotatably driving said supporting means and thereby causing rotational movement of the casing, guiding means extending transversely from said pedestal in spaced relation with said second supporting means, a lever arm mounted on said guiding means for movement longitudinally thereon, and a pressure roller of relatively narrow width compared to the casing tread width supported on said lever arm and movable across the width of the tread to apply pressure to the tread of the said casing.

3. In a machine for retreading tire casings, a pedestal, a support member mounted on said pedestal, supporting means mounted on said support member for supporting a tire casing having a tread width, means connected with said supporting means for rotatably driving said supporting means and thereby causing a rotational movement of the tire casing, a vertically adjustable transversely extending member mounted on said pedestal in spaced relation with said support member and said supporting means, a lever arm movably mounted on said transversely extending member for movement transversely of a tire casing on said supporting means, and a pressure roller of relatively narrow width compared to the tread width supported on said lever arm and movable across the width of the tread to apply pressure to the said tread of the said casing.

4. In a machine for retreading tire casings, a pedestal, a support member mounted on said pedestal, supporting means mounted on said support member for supporting a tire casing of given tread width, means connected with said supporting means for rotatably driving said supporting means and thereby causing rotational movement of the tire casing, a vertically adjustable transverse member extending from said pedestal in spaced relation with said support member and said roller means including a rod-like arcuate portion, said arcuate portion being movable relative to said pedestal, a lever arm mounted on said rod-like arcuate portion of said transverse member for longitudinal movement thereon, and a pressure roller of relatively narrow width compared to the given tread width supported on said lever arm and movable across the width of the tread to apply pressure to the tread of the said casing.

5. In a machine for retreading tire casings, a pedestal, a support member mounted on said pedestal, roller means rotatably journaled on said support member for supporting a tire casing of given tread width, means for selectively driving one of said roller means, a transverse member extending from said pedestal in spaced relation with said support member and said roller means and having a rod-like arcuate portion, a lever arm slidably mounted on said rod-like arcuate portion, handle means at one extremity of said lever arm for manually controlling the said lever arm, and a pressure roller positioned on said lever arm between said handle means and said rod-like arcuate portion, said pressure roller being of relatively narrow width compared to the tread width and movable across the width of the tread to apply pressure to the tread of the said casing.

6. In a machine for stitching retread material to a tire casing, a pedestal, a support member mounted on said pedestal, a pair of rollers for supporting a tire casing having a tread width, said rollers being journaled on parallel axes on said support member, a drive motor for said rollers, a variable speed transmission connecting said drive motor with at least one of said rollers whereby the roller speed can be controlled, a transverse member extending from said pedestal above the said rollers and in spaced relation therewith and including a rod-like arcuate portion, a lever arm slidably engaging at one extremity thereof the said rod-like arcuate portion, handle means at the other extremity of said lever arm for manually controlling said lever arm, and a pressure roller positioned on said lever arm between the said extremities thereof, said pressure roller being of relatively narrow width compared to the tread width and movable across the width of the tread to apply pressure to the tread of the said casing.

7. In a machine for retreading tire casings, a pedestal, a supporting member mounted on said pedestal, a pair of roller means for supporting a tire casing having a tread width, said roller means being journaled on horizontal axes on said supporting member, means for driving one of said roller means at high speed or at low speed or for disconnecting said roller means from the source of power, a bracket positioned above said roller means and being arcuate in a path substantially transversely concentric with the casing of a tire supported by said roller means, an arm carried on said bracket means and slidable thereon transversely of a tire on said roller means, a pressure roller of relatively narrow width compared to the tread width supported on said arm between its ends whereby movements of said arm along the bracket will move said roller means across the width of the tread of said casing, and handle means on one end of said arm for controlling the sliding movements thereof and the pressure with which said roll bears on the casing of the tire.

8. In a machine for retreading tire casings, a pedestal, support means mounted on said pedestal, roller means journaled on said support means and adapted to support a tire casing having a tread width, driving means for said roller means and drivingly connected therewith, guiding means extending from said pedestal above and in spaced relation with said support means and said roller means, arm means on said guiding means and movable thereon, and auxiliary roller means supported from said pedestal and movable relative to said first mentioned roller means whereby a tire casing can be engaged at a plurality of spaced points around its inner periphery.

GORDON M. FLYNN.

REFERENCES CITED

The following references are of record in the file of this patent:

UNITED STATES PATENTS

| Number | Name | Date |
| --- | --- | --- |
| 1,194,565 | Stevens | Aug. 15, 1916 |
| 1,311,578 | Stilson | July 29, 1919 |
| 1,768,341 | Stevens | June 24, 1930 |
| 1,768,912 | Krause et al. | July 1, 1930 |
| 2,009,643 | Woock | July 30, 1935 |
| 2,085,650 | Godfrey | June 29, 1937 |
| 2,110,293 | Fisher | Mar. 8, 1938 |
| 2,177,165 | Beckman | Oct. 24, 1939 |
| 2,474,511 | Bacon | June 28, 1949 |